(12) United States Patent
Hua et al.

(10) Patent No.: US 9,225,940 B2
(45) Date of Patent: Dec. 29, 2015

(54) METHOD AND APPARATUS FOR REAL-TIME IPTV CHANNEL SEARCHING AND SWITCHING

(75) Inventors: Suzann Hua, Lisle, IL (US); Ahmed Zaki, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1792 days.

(21) Appl. No.: 12/163,060

(22) Filed: Jun. 27, 2008

(65) Prior Publication Data

US 2009/0328091 A1    Dec. 31, 2009

(51) Int. Cl.
| | |
|---|---|
| *H04N 7/16* | (2011.01) |
| *H04N 7/167* | (2011.01) |
| *H04N 7/173* | (2011.01) |
| *H04N 21/258* | (2011.01) |
| *H04N 21/2668* | (2011.01) |
| *H04N 21/462* | (2011.01) |
| *H04N 21/4782* | (2011.01) |
| *H04N 21/482* | (2011.01) |

(52) U.S. Cl.
CPC ..... *H04N 7/17318* (2013.01); *H04N 21/25891* (2013.01); *H04N 21/2668* (2013.01); *H04N 21/4622* (2013.01); *H04N 21/4782* (2013.01); *H04N 21/482* (2013.01)

(58) Field of Classification Search
CPC ............ H04N 21/435; H04N 21/6547; H04N 21/8166
See application file for complete search history.

(56) References Cited

U.S. PATENT DOCUMENTS

| | | | |
|---|---|---|---|
| 6,745,392 B1 * | 6/2004 | Basawapatna et al. | 725/120 |
| 2006/0031883 A1 * | 2/2006 | Ellis et al. | 725/58 |
| 2007/0067807 A1 * | 3/2007 | O'Neil | 725/62 |
| 2009/0006626 A1 * | 1/2009 | Yamagishi | 709/226 |
| 2009/0298535 A1 * | 12/2009 | Klein et al. | 455/556.1 |
| 2009/0320065 A1 * | 12/2009 | Sloo et al. | 725/37 |

\* cited by examiner

*Primary Examiner* — Gigi L Dubasky
(74) *Attorney, Agent, or Firm* — Fay Sharpe LLP

(57) ABSTRACT

With regard to the exemplary method, a first communication is received from an IPTV subscriber at an IPTV application server via the subscriber's Web-accessible device. The server accesses level of service data for the subscriber and displays a new Web page based on the level of service data. The Web page includes a list of applicable channels. The server also determines whether the subscriber has a set-top box that is powered on. Where the subscriber does have a set-top box and the set-top box is powered off, data received from the subscriber is saved in the database. Where the subscriber does have a set-top box and the set-top box is powered on, the subscriber is allowed to perform a switching function for each applicable and currently viewable channel on a search result list. Finally, a signal to the set-top box to change the channel.

15 Claims, 3 Drawing Sheets

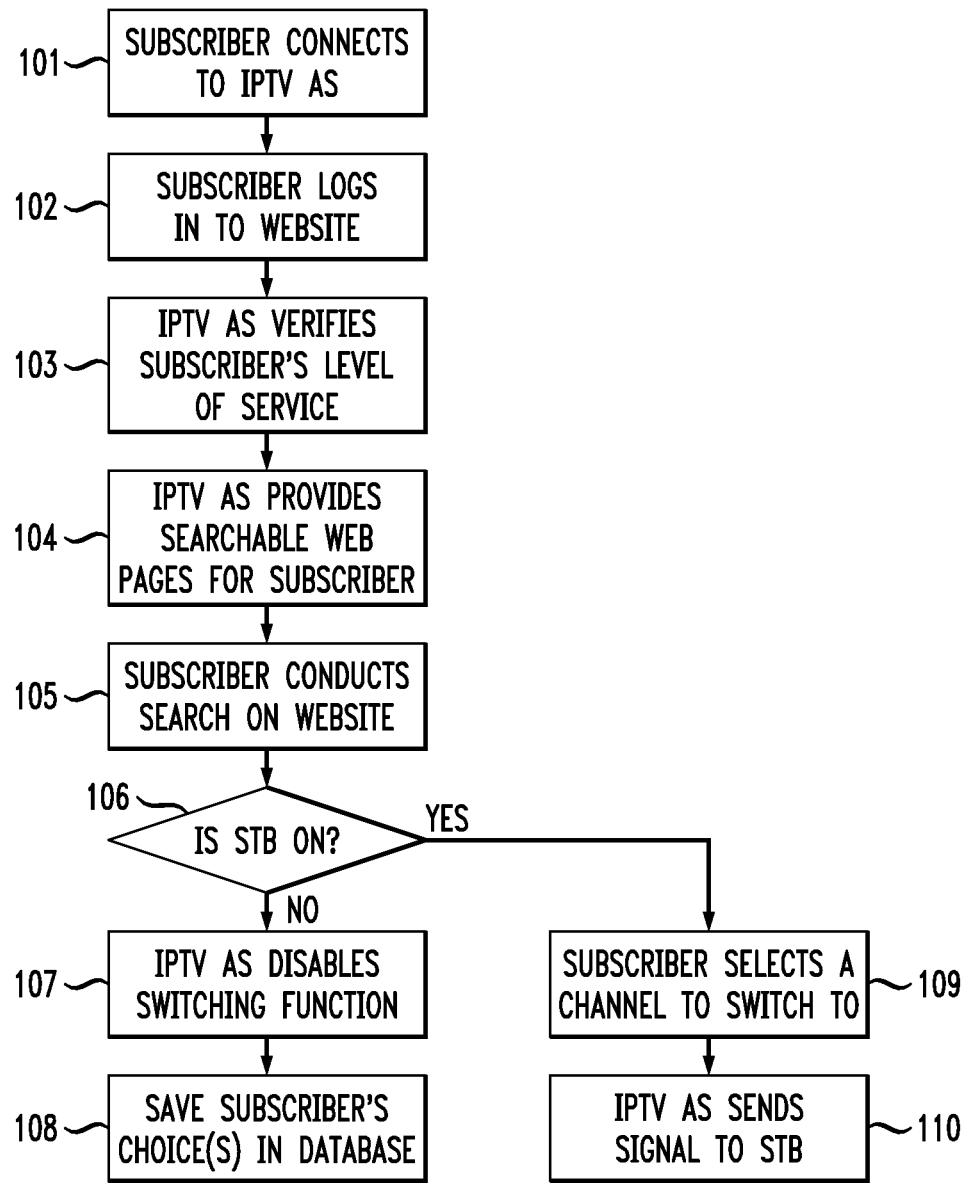

METHOD AND APPARATUS FOR REAL-TIME IPTV CHANNEL SEARCHING AND SWITCHING

BACKGROUND OF THE INVENTION

This invention relates to a method and apparatus for real-time IPTV channel searching and switching via a Web-accessible device. While the invention is particularly directed to the art of telecommunications, and will be thus described with specific reference thereto, it will be appreciated that the invention may have usefulness in other fields and applications.

By way of background, IPTV (Internet Protocol Television) is a system in which digital television service is delivered by using Internet Protocol over a network infrastructure, which may include delivery by a broadband connection. A general definition of IPTV is television content that, instead of being delivered through traditional broadcast and cable formats, is received by the viewer through the technologies used for computer networks.

For residential users, IPTV is often provided in conjunction with Video on Demand and may be bundled with Internet services such as Web access and VoIP. In businesses, IPTV may be used to deliver television content over corporate LANs.

IPTV covers both live TV (multicasting) as well as stored video (Video on Demand VOD). The playback of IPTV requires either a personal computer or a set-top box connected to a TV. Video content is typically compressed using either a MPEG-2 or a MPEG-4 codec and then sent in an MPEG transport stream delivered via IP Multicast in case of live TV or via IP Unicast in case of Video on Demand. IP Multicast is a method in which information can be sent to multiple computers at the same time.

However, today's IPTV service does not allow real-time channel searching and switching functions via a separate internet accessible device. In particular, today's IPTV channel switching can only be performed by the TV terminal controller or by the cable/satellite TV controller. Such controllers do not offer comprehensive, flexible and real-time TV channel search capabilities.

The present invention contemplates a new and improved method and apparatus that resolves the above-referenced difficulties and others.

SUMMARY OF THE INVENTION

A method and apparatus for real-time IPTV channel searching and switching via Web-accessible devices are provided.

In accordance with an aspect of the present invention, a method of providing real-time channel searching and switching for IPTV is provided. The method includes: receiving a first communication from an IPTV subscriber at an IPTV application server upon the subscriber logging in to the server via the subscriber's Web-accessible device; communicating with a subscriber database to access level of service data for the subscriber; displaying a new Web page for the subscriber based on the level of service data, wherein the Web page includes a list of applicable channels based on a keyword search typed by the subscriber via the subscriber's Web-accessible device; determining whether the subscriber has a set-top box that is powered on; where the subscriber does have a set-top box and the set-top box is powered off, saving data received from the subscriber in the database; where the subscriber does have a set-top box and the set-top box is powered on, allowing the subscriber to perform a switching function for each applicable and currently viewable channel on a search result list; and sending a signal to the set-top box to change the channel.

Further, the database may store one or more of the following types of data: subscriber name data, subscriber profile data, IPTV registration data, subscriber billing account data, and IPTV channels data.

In accordance with another aspect of the present invention, an apparatus for providing real-time channel searching and switching in an IPTV network is provided. The apparatus comprises: a subscriber database; and an IPTV application server. The application server is operative to: receive a first communication from an IPTV subscriber; communicate with the subscriber database to access level of service data for the subscriber; display a new Web page for the subscriber based on the level of service data; determine whether the subscriber has a set-top box that is powered on; save data received from the subscriber in the database; allow the subscriber to perform a switching function for each applicable and currently viewable channel on a search result list; and send a signal to the set-top box to change the channel.

In accordance with yet another aspect of the present invention, a system for providing real-time channel searching and switching for IPTV is provided. The system comprises: receiving means for receiving a first communication from an IPTV subscriber; communicating means for communicating with a subscriber database to access level of service data for the subscriber; displaying means for displaying a new Web page for the subscriber based on the level of service data; determining means for determining whether the subscriber has a set-top box that is powered on; saving means for saving data received from the subscriber in the database; means for allowing the subscriber to perform a switching function for each applicable and currently viewable channel on a search result list; and sending means for sending a signal to the set-top box to change the channel.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 3 is a flowchart illustrating an exemplary method of providing channel searching and switching functions for IPTV subscribers.

DETAILED DESCRIPTION

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 1:
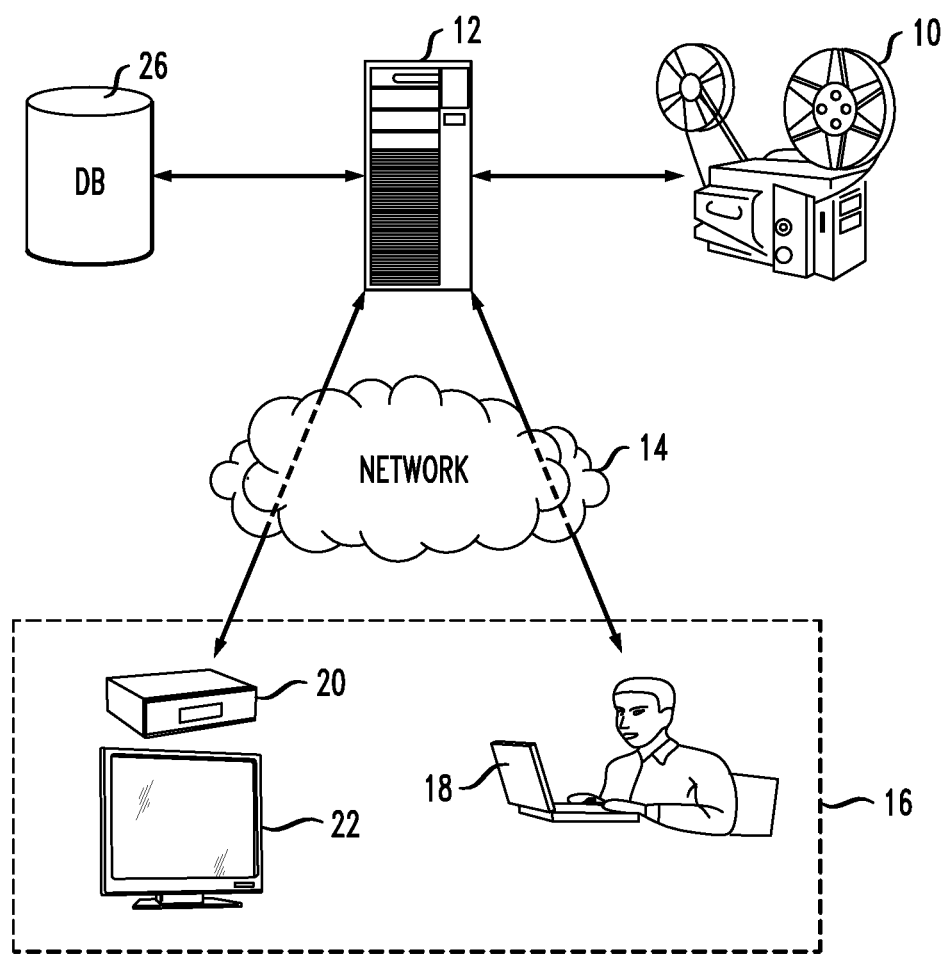
FIG. 1 is a diagram of an IPTV architecture suitable for implementing aspects of the present invention.

Referring now to the drawings wherein the showings are for purposes of illustrating the exemplary embodiments only and not for purposes of limiting the claimed subject matter, FIG. 1 provides a view of an IPTV architecture into which the presently described embodiments may be incorporated. The major functional components of the IPTV architecture include at least one content source 10, an IPTV application server (AS) 12, a distribution network 14, and a home viewing network 16.

The content source 10 represents a functionality that receives video content from producers, and other sources, encodes the content and, for VoD, stores content in an acquisition database.

The IPTV AS 12 receives IPTV streams from the content source 10 and broadcasts within the home viewing network 16 the IPTV streams associated with television broadcasts, pay-per view broadcasts, Internet video broadcasts and the like. The maximum number of available IPTV streams is bounded by the IPTV AS 12 capabilities or the maximum bandwidth capabilities of the home viewing network 16.

The distribution network 14 provides the distribution capability, capacity, quality of service and other capabilities, such as multicast, necessary for the reliable and timely distribution of IPTV data streams from the IPTV AS 12 to the home viewing network 16.

The home viewing network 16 is a network that has one or more communication devices 18, one or more Set-Top Boxes (STBs) 20, and one or more viewing devices 22.

Customer delivery of IPTV is generally provided over the existing loop plant and the phone lines to homes using the higher-speed DSL technologies such as ADSL2+ and VDSL. Service providers may use a combination of Fiber-to-the Curb (FTTC) and DSL technologies or implement direct Fiber-to-the-Home (FTTH) access depending on the richness of their IPTV service offerings.

The components of the home viewing network 16 may be arranged in any desired fashion. The IPTV AS 12 interfaces with the home viewing network 16 via the distribution network 14, which is typically a SIP-based system. SIP (Session Initiation Protocol) is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer; it can run on TCP, UDP, or SCTP. The latest version of the specification is RFC 3261 from the IETF SIP Working Group. It is widely used as a signaling protocol for Voice over IP, along with H.323 and others.

The home viewing network 16 may be wired, wireless, or a combination of wired and wireless. It is also noted that although the term "home" is used in connection with the phrase "home viewing network" that the network is not limited to a residential home or dwelling. That is, any local area network within a defined area viewing area accessible to a single account with an IPTV provider may be viewed as a home viewing network.

The communication device 18 generally comprises a computer (desktop or laptop), a PDA, or a wireless phone that can connect to the Internet and log in to a Web-based IPTV service account.

The set-top box 20 is the functional unit that terminates the IPTV traffic at the home viewing network. This device performs the functional processing, which includes setting up the connection and QoS (Quality of Service) with the Service Node, decoding the video streams, channel change functionality, user display control, and connections to user appliances such as a standard-definition TV or HDTV monitor.

The viewing device 22 is a standard-definition or high definition television or a monitor that permits video or television broadcasts to be viewed thereon. In some cases, the STB (Digital Versatile Recorder (DVR), etc.) 20 may be viewed as a remote viewing device, if that STB includes the processing instructions associated with directly interfacing with the distribution network 14. Moreover, each remote viewing device directly interfaces with a viewing device that is capable of presenting the IPTV streams of the home viewing network. Also, in some cases where the remote viewing device is not a STB, a remote viewing device may be directly interfaced with that STB.

The IPTV AS 12 generally includes a CPU (not shown) such as a microprocessor or a secure server and is in communication with a subscriber database 26 for storing pertinent information relating to the subscriber's IPTV service. The database 26 may be a Home Subscriber Server (HSS), or a special dedicated database for IPTV service. An HSS is a master user database that supports the IMS network entities that actually handles calls. It contains the subscription-related information (user profiles), performs authentication and authorization of the user, and can provide information about the user's physical location.

Figure 2:
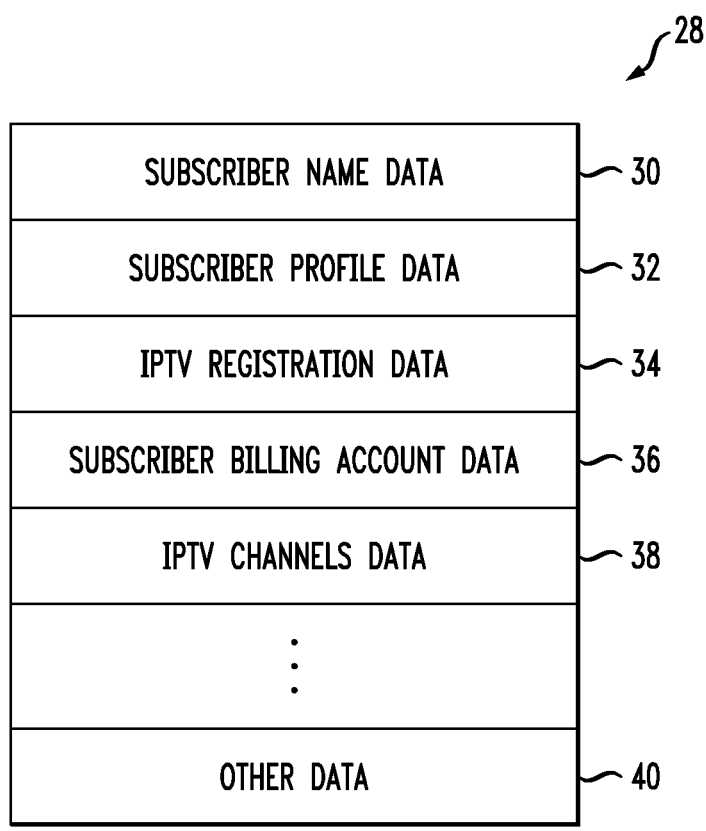
FIG. 2 is a memory layout of data stored in the database for IPTV subscribers in accordance with aspects of the present invention.

The subscriber database 26 generally includes any number of data sub-blocks for each circuit-switched telephone subscriber also having IPTV service, as shown in FIG. 2. They are shown as a super block 28, not all of whose fields are filled for a particular subscriber. The super block 28, as known in the art, can be accessed from the identity of any one of several fields within it. The super block 28 includes any number of data sub-blocks, including a first sub-block 30 that contains subscriber name data, a second sub-block 32 that contains subscriber profile data, a third sub-block 34 that contains IPTV registration data, a fourth sub-block 36 that contains subscriber billing account data, and a fifth sub-block 38 that contains available IPTV channels data (or level of service data). Of course, any number of additional sub-blocks 40 may be provided in the super block 28 for storing other pertinent data.

A flowchart illustrating an exemplary method of providing channel searching and switching functions for IPTV subscribers is shown in FIG. 3. Initially, the IPTV subscriber uses the communication device 18 to connect to the IPTV AS 12 via the Internet 14 (101). The subscriber then logs in to their account (102). The IPTV AS 12 communicates with the database 26 to determine the subscriber's level of service, which includes the available channels for that subscriber (103). The IPTV AS 12 then displays a new Web page for the subscriber based on the level of service (104). The subscriber then searches the available channels via the Web site (105). Next, the IPTV AS 12 determines whether the STB 20 is powered on (106). If the IPTV STB 20 is powered off, then the subscriber will not be able to perform a switching function (107). However, the subscriber may save one or more choices for future use (108). In that case, the choices would be saved in the database 26. If the IPTV STB 20 is powered on, then the subscriber will be able to perform a switching function for each of the applicable and currently viewable channels on the search result list (109). In other words, the subscriber clicks on the "switch" button or link for a particular channel. In that case, the IPTV AS 12 sends the appropriate signal to the STB 20 to change the channel per the subscriber's request (110).

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of providing real-time channel searching and switching for IPTV, the method comprising:
   receiving a first communication from an IPTV subscriber at an IPTV application server upon the subscriber logging in to the server via the subscriber's Web-accessible device;
   communicating with a subscriber database to access level of service data for the subscriber;
   displaying a new Web page for the subscriber based on the level of service data, wherein the Web page includes a list of applicable channels based on a keyword search typed by the subscriber via the subscriber's web-accessible device;
   determining whether the subscriber has a set-top box that is powered on;
   where the subscriber does have a set-top box and the set-top box is powered off, saving data received from the subscriber in the database;
   where the subscriber does have a set-top box and the set-top box is powered on, allowing the subscriber to perform a switching function for each applicable and currently viewable channel on a search result list; and
   sending a signal to the set-top box to change the channel.

2. The method of claim 1, wherein the database stores one or more of the following types of data: subscriber name data, subscriber profile data, IPTV registration data, subscriber billing account data, and IPTV channels data.

3. The method of claim 1, wherein the level of service data includes all available channels for the subscriber.

4. The method of claim 1, wherein the database comprises a Home Subscriber Server (HSS).

5. The method of claim 1, wherein the IPTV application server interfaces with the subscriber via a SIP-based distribution network.

6. An apparatus for providing real-time channel searching and switching in an IPTV network, the apparatus comprising:
   a subscriber database; and
   an IPTV application server operative to:
   receive a first communication from an IPTV subscriber;
   communicate with the subscriber database to access level of service data for the subscriber;
   display a new Web page for the subscriber based on the level of service data;
   determine whether the subscriber has a set-top box that is powered on;
   save data received from the subscriber in the database, where the subscriber does have a set-top box and the set-top box is powered off;
   allow the subscriber to perform a switching function for each applicable and currently viewable channel on a search result list; and
   send a signal to the set-top box to change the channel.

7. The apparatus of claim 6, wherein the database stores one or more of the following types of data: subscriber name data, subscriber profile data, IPTV registration data, subscriber billing account data, and IPTV channels data.

8. The apparatus of claim 6, wherein the level of service data includes all available channels for the subscriber.

9. The apparatus of claim 6, wherein the database comprises a Home Subscriber Server (HSS).

10. The apparatus of claim 6, wherein the IPTV application server interfaces with the subscriber via a SIP-based distribution network.

11. A non-transitory computer-usable data carrier storing instructions that, when executed by a computer, cause the computer to:
   receive a first communication from an IPTV subscriber;
   communicate with a subscriber database to access level of service data for the subscriber;
   display a new Web page for the subscriber based on the level of service data;
   determine whether the subscriber has a set-top box that is powered on;
   save data received from the subscriber in the database, where the subscriber does have a set-top box and the set-top box is powered off;
   allow the subscriber to perform a switching function for each applicable and currently viewable channel on a search result list; and
   send a signal to the set-top box to change the channel.

12. The non-transitory computer-usable data carrier of claim 11, wherein the database stores one or more of the following types of data: subscriber name data, subscriber profile data, IPTV registration data, subscriber billing account data, and IPTV channels data.

13. The non-transitory computer-usable data carrier of claim 11, wherein the level of service data includes all available channels for the subscriber.

14. The non-transitory computer-usable data carrier of claim 11, wherein the database comprises a Home Subscriber Server (HSS).

15. The non-transitory computer-usable data carrier of claim 11, wherein the IPTV application server interfaces with the subscriber via a SIP-based distribution network.

* * * * *